June 30, 1925.
W. F. BOUCHÉ
1,543,981
ELECTRICAL SYSTEM OF DISTRIBUTION
Filed Jan. 21, 1922
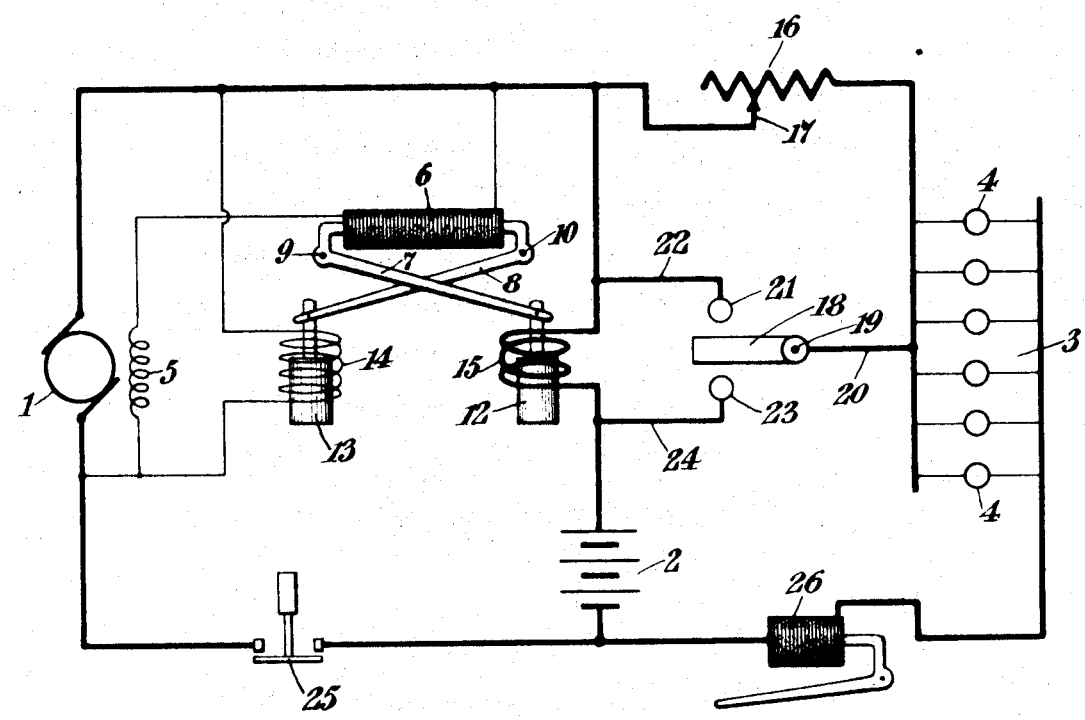
Inventor
William F. Bouché
By his Attorney
Gorham Crosby Patented June 30, 1925.

1,543,981

UNITED STATES PATENT OFFICE.

WILLIAM F. BOUCHÉ, OF LANCASTER, NEW YORK, ASSIGNOR, BY MESNE ASSIGN-MENTS, TO THE GOULD COUPLER COMPANY, A CORPORATION OF MARYLAND.

ELECTRICAL SYSTEM OF DISTRIBUTION.

Application filed January 21, 1922. Serial No. 530,888.

*To all whom it may concern:*

Be it known that I, WILLIAM F. BOUCHÉ, a citizen of the United States, and resident of Lancaster, in the county of Erie and State of New York, have invented certain new and useful Improvements in Electrical Systems of Distribution, of which the following is a specification.

My invention relates to improvements in electrical systems of distribution, and more particularly to systems employing a variable speed generator adapted to feed a storage battery and lighting or other work circuit connected in parallel with the battery to the generator. In such systems, it is common to employ means for regulating the generator including a coil responsive to current changes. In some cases this coil is connected so as to be responsive to changes in the battery current and in some cases responsive to changes in the total generator current. My invention provides an improved arrangement for quickly changing from one form of regulation to the other and without disconnecting the lighting or work circuit from the battery and generator. Further and more specific objects, features and advantages will more clearly appear from the detail description given below taken in connection with the accompanying drawing which forms a part thereof.

The drawing illustrates diagrammatically a system embodying my invention in a preferred form thereof.

Referring to the drawing, 1 represents a shunt dynamo or generator driven at variable speed as from the axle of a railway car, and connected to be fed thereby in parallel is a storage battery 2 and work circuit 3. In the present instance the work circuit is shown as composed of a series of lamps 4 connected to be supplied from the generator in parallel. 5 represents the generator shunt field which is connected across the terminals of the generator but in series with a carbon pile variable resistance 6, one end of which is adapted to be compressed by a lever 7 and the other end by a lever 8 pivoted at 9 and 10 respectively. Connected to the lever 7 is a solenoid core 12 and connected to the lever 8 is a solenoid core 13. A solenoid coil 14 surrounds the core 13 and is connected across the terminals of the generator so as to be responsive to voltage changes of the system. A solenoid coil 15 surrounds the core 12 and is connected in series between the generator and the battery 2. 16 represents a resistance connected in series between the generator 1 and one side of the work circuit 3, this resistance being variable or adjustable as by means of sliding contact 17. 18 represents a switch member pivoted at 19 and being permanently connected as by conductor 20 to the same side of the work circuit 3, to which the resistance 16 is connected. 21 represents a switch contact connected by conductor 22 to the circuit between the current coil 15 and the resistance 16 and likewise between the current coil 15 and generator 1 and between the resistance 16 and generator 1. 23 represents a contact connected by conductor 24 between the coil 15 and the battery 2. The switch 18 is adapted to be thrown to make electrical contact with contact 21 or with contact 23.

Assuming the switch 18 to be in contact with contact 21, the coil 15 will be placed in the battery branch and the resistance 17 will be short-circuited by conductor 20, switch 18 and conductor 22 so that the generator will be connected to the lamps through this connection. The coil 15 will be responsive to battery current changes and as the generator speeds up, if the current going to the battery exceeds a predetermined value, the core 12 will be lifted and the resistance increased, so as to increase the resistance in series with the field 5 and reduce the field current and so maintain the current going to the battery substantially constant or below a predetermined value. When the battery becomes substantially charged as indicated by a predetermined rise in voltage thereof, the coil 14 will become sufficiently energized to raise core 13 and so increase resistance 6 as to prevent any further rise in voltage of the generator and cause the battery charging current to be reduced as desired. In some cases, it is desired that the total generator current be maintained substantially constant during the charging of the battery, and in such case the switch 18 is thrown to contact 23 whereupon the coil 15 is shifted from the battery branch to the main circuit where it is in series with both the battery and work circuit and in shunt with the resistance 16. By thus placing the resistance 16 in shunt with the coil 15, the coil 15 will regulate for a considerably larger current, that is, it will tend to maintain constant a considerably larger current which is the total current from the generator, the value of current being determined by adjustment of the variable resistance 16. It will thus be seen that the same current coil 15 may be quickly and conveniently shifted from one form of regulation to the other by a simple throw of the switch 18 and without disconnecting the lighting or work circuit from either the generator or the battery because when the switch 18 is off of both contacts 21 and 23 and is being moved from one to the other, the low resistance 16 still connects the work circuit with both the generator and the battery. This is brought about by connecting the resistance 16 in shunt to the switching means.

Any suitable form of main switch may be used as indicated at 25 operated automatically to disconnect the generator when its voltage drops below that of the battery and to connect the generator to the battery and work circuit when its voltage has picked up to the desired value. Also any suitable form of lamp regulator may be used connected between the generator and battery on one side and the lamps on the other side as indicated by the carbon pile variable resistance at 26 which likewise may be operated automatically in any suitable or well-known manner.

Although I have described my improvements in great detail, I do not desire to be limited thereto since many changes and modifications may be made and the invention embodied in widely different forms without departing from the spirit and scope thereof in its broader aspects.

What I claim as new and desire to secure by Letters Patent, is:

1. The combination of a variable speed generator, a battery circuit and work circuit adapted to be fed thereby in parallel, means for regulating the generator including a coil responsive to current changes in circuit between the generator and battery, a resistance connected in circuit between the generator and work circuit, and a switch, in one position connecting one side of the work circuit to the battery circuit between said coil and the battery, and in another position connecting said side of the work circuit to the other side of said coil, said resistance being connected in circuit between the generator and work circuit with the switch in either position.

2. The combination of a variable speed generator, a battery circuit and work circuit adapted to be fed thereby in parallel including a coil responsive to current changes in circuit between the generator and battery, switching means for connecting one side of the work circuit to either side of said coil, and a resistance connected in shunt to said switching means.

3. The combination of a variable speed generator, a battery circuit and work circuit adapted to be fed thereby in parallel, means for regulating the generator including a coil responsive to current changes in circuit between the generator and battery, switching means for connecting one side of the work circuit to either side of said coil, and means in shunt relation to said switching means permitting continuous flow of current to the work circuit while said switching means is open.

4. The combination of a variable speed generator, a battery circuit and work circuit adapted to be fed thereby in parallel, means for regulating the generator including a coil responsive to current changes in circuit between the generator and battery, a switch for connecting one side of the work circuit to either side of said coil, and means shunting said switch in both of its closed positions.

5. The combination of a variable speed generator, a battery circuit and work circuit adapted to be fed thereby in parallel, means for regulating the generator including a coil responsive to current changes, a resistance connected in series with the work circuit to one side thereof, said coil being connected in series with the battery, and switching means in shunt to said resistance, for connecting the same side of the work circuit to either side of said coil.

6. The combination of a variable speed generator, a battery circuit and work circuit adapted to be fed thereby in parallel, means for regulating the generator including a coil responsive to current changes, a variable resistance connected in series with the work circuit, said coil being connected in series with the battery, and switchng means in shunt to said resistance for connecting the same side of the work circuit to either side of said coil, whereby with the switch in one position said coil is responsive to battery current changes and in the other position to total generator current changes.

7. The combination of a variable speed generator, a battery circuit and work circuit adapted to be fed thereby in parallel, means for regulating the generator including a coil responsive to current changes, a resistance connected in series with the work circuit, said coil being connected in series with the battery and switching means in shunt to said resistance, for connecting the same side of the work circuit to either side of said coil, whereby with the switch in one position said coil is responsive to battery current changes and said resistance is shortcircuited and in the other position said coil is in shunt to said resistance and is responsive to total generator current changes.

8. The combination of a variable speed generator, a battery circuit and work circuit adapted to be fed thereby in parallel, means for regulating the generator including a coil responsive to current changes, an adjustable resistance connected in series with the work circuit to one side thereof, said coil having one terminal connected between the generator and said resistance and its other terminal connected to the battery, and a switch for connecting the same side of the work circuit to either side of said coil whereby with the switch in one position said coil is responsive to battery current changes and said resistance is shortcircuited and in the other position said coil is in shunt to said resistance and is responsive to total generator current changes.

Signed at Depew, in the county of Erie, and State of New York, this 19th day of January, A. D. 1922.

WILLIAM F. BOUCHÉ.